United States Patent
Nelson

(10) Patent No.: US 7,454,742 B2
(45) Date of Patent: Nov. 18, 2008

(54) SYSTEM AND METHOD FOR AUTOMATICALLY STARTING A DOCUMENT ON A WORKFLOW PROCESS

(75) Inventor: Kenneth Carlin Nelson, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 10/378,235

(22) Filed: Mar. 1, 2003

(65) Prior Publication Data

US 2004/0172585 A1 Sep. 2, 2004

(51) Int. Cl.
*G06F 9/44* (2006.01)
(52) U.S. Cl. .................. 717/104; 717/102; 717/103; 718/100
(58) Field of Classification Search ................ 717/100, 717/103, 102, 104; 707/2, 10; 718/100
See application file for complete search history.

(56) References Cited

U.S. PATENT DOCUMENTS

| | | | |
|---|---|---|---|
| 5,515,531 A | 5/1996 | Fujiwara et al. | 395/600 |
| 5,692,174 A | 11/1997 | Bireley et al. | 395/603 |
| 5,813,005 A | 9/1998 | Tsuchida et al. | 707/10 |
| 6,101,495 A | 8/2000 | Tsuchida et al. | 707/4 |
| 6,192,359 B1 | 2/2001 | Tsuchida et al. | 707/4 |
| 6,266,660 B1 | 7/2001 | Liu et al. | 707/3 |
| 6,393,415 B1* | 5/2002 | Getchius et al. | 707/2 |
| 6,493,731 B1* | 12/2002 | Jones et al. | 715/501.1 |
| 6,584,466 B1* | 6/2003 | Serbinis et al. | 707/10 |
| 7,171,664 B2* | 1/2007 | Wang et al. | 718/100 |
| 2003/0106039 A1* | 6/2003 | Rosnow et al. | 717/100 |

OTHER PUBLICATIONS

"Implementing an Electronic Records Management Program", Philip C. Bantin, Workshop for ARMA, Apr. 2002 (39 pages). [Online] [Retrieved at] <www.indiana.edu/~libarch/ER>.*
"Using Domino Workflow", IBM Redbook, published May 2000 (336 pages). [Online] [Retrieved at] <www.redbooks.ibm.com/redbooks/pdfs/sg245963.pdf>.*
R,Miller, "DB2® for z/OS Technology Highlights," 2002.
"Partitioned Tables and Indexes," http://download-west.oracle.com/otndoc/oracle9i/901_doc/server.901/α88856/c12parti.htm; Aug, 30, 2002.

* cited by examiner

*Primary Examiner*—Tuan Q. Dam
*Assistant Examiner*—Thuy Dao
(74) *Attorney, Agent, or Firm*—Sughrue Mion, PLLC

(57) ABSTRACT

A system automates workflow routing within a system such as a content management system. The system administrator specifies initial workflow process and priorities for item types, ItemTypes. When the administrator defines an Item-Type, a drop-down field is provided by the present system in which the available process names are displayed. A second drop-down field provided by the present system will contain the priority for the work. The administrator may select one of each for the new document, item, or folder. This process and priority information is stored as part of the ItemType definition in the library server. When an item is created, the library server checks the definition of the ItemType. If auto-workflow is specified, a work package is created by the present system on the first node in the specified process. The priority of the item is also set as previously defined by the administrator.

32 Claims, 5 Drawing Sheets

SYSTEM AND METHOD FOR AUTOMATICALLY STARTING A DOCUMENT ON A WORKFLOW PROCESS

CROSS-REFERENCE TO RELATED APPLICATION

The present application relates to copending U.S. patent application, titled "Method, System, and Program for Optimizing Database Query Execution," Ser. No. 10/353,138, filed on Jan. 27, 2003, which is assigned to the same assignee as the present application.

FIELD OF THE INVENTION

The present invention generally relates to the field of data file management in database management system models. More particularly, the present invention relates to a system and associated method for automatically starting a document on a workflow process, as specified by the system administrator according to predefined routing rules.

BACKGROUND OF THE INVENTION

Content management is an infrastructure to manage a wide spectrum of digital information. Large collections of scanned images, facsimiles, electronic office documents, Extensible Markup Language (XML) and Hypertext Markup Language (HTML) files, computer output, audio, video, multimedia, and virtual reality content can be stored and accessed through the content management system. The content management system integrates content with line of business, customer service, enterprise resource planning, digital asset management, distance learning, Web content management or other applications to accelerate benefits across the enterprise.

The content manager product may be visualized as a triangle. The three vertices of this triangle are the client, a library server and a resource manager. The client is the user interface, and provides the user with the capability of storing, searching for, and marking-up objects such as documents, files, etc. The library server is the equivalent of a card catalog that holds information about the objects, including their location. The resource manager (RM) is the storage location for either the actual object or a pointer to the actual object.

The core library server logic (except for system utilities and housekeeping tasks) is packaged as a set of relational database (RDB) stored procedures (SPs) containing embedded SQL statements. Each stored procedure (SP) is precompiled and runs on a relational database (RDB) server. Consequently, each Library Server (LS) process is a relational database (RDB) server process. Stored procedures (SPs) can be executed through the library server's SQL interface. The library server can be remotely accessed through a relational database (RDB) client.

The Resource Managers (RMs) may support different/ multiple access protocols. The resource manager (RM) supports the HTTP protocol.

The basic information entities managed by the library server are "items." As used herein, the "items" can be categorized in two types: simple items and resource items. Resource items can have content associated with them that is stored in one or more resource managers. Resource items point to their content via resource URL-RELATED DATA.

The library server (LS) and resource manager (RM) are separate processes, often running on different machines. In operation, clients first contact the library server (LS) to create/update an index for an object, and to determine where the object is to be stored/replaced. The client then sends a request to the resource manager (RM) to store/replace the object.

Attaching an item or document to an automated workflow process would enhance the convenience of a content management system and streamline the process of handling documents and other items. For example, a personnel employee creates a document "expense account" to reimburse expenses to an employee. The "expense account" document must wait until all receipts have been received before being reviewed by the appropriate manager. Once the receipts have been received, the document is reviewed to verify that all expenses are within company guidelines. If all the expenses are within guidelines, the document is routed to the appropriate manager for authorization and on to the appropriate employee for reimbursement. If the expenses are not within guidelines, the document is routed back to the employee for correction.

Currently, the process of routing an item is performed manually. The administrator can not automatically specify the process required for the newly created item. Rather, the desired process for the folder is communicated to each user. Relying on the end user to understand and apply the workflow process rules introduces situations where the wrong process is selected. The advantage of automating workflow process is the prevention of end user errors and uniform treatment of items within the process.

Thus, there is need for an automated workflow system and process for automatically and dynamically starting and maintaining the progress of an item such as a document or folder on a workflow process. The need for such system and method has heretofore remained unsatisfied.

SUMMARY OF THE INVENTION

The present invention satisfies this need, and presents a system, a computer program product, and an associated method (collectively referred to herein as "the system" or "the present system") for automatically starting a document on a workflow process. The workflow process is a series of steps where a user can retrieve and make decisions about the document.

When creating an item type, ItemType, a system administrator specifies for that ItemType initial workflow process and priorities. When the administrator defines an ItemType, a drop-down field is provided by present system in which the available process names are displayed. A second field provided by the present system will contain the priority for the work. The administrator may select one of each for the new document, item, or folder. This process and priority information is stored as part of the ItemType definition in the library server.

When an item is created, the library server checks the definition of the ItemType. If auto-workflow is specified, a work package is created by the present system on the first node in the specified process. The priority of the item is also set as previously defined by the administrator. The present system assigns a workflow process and priority to a selected folder.

Prior technology allowed the end user to define the target process for any type of document. It was the user's responsibility to understand the business rules and apply them properly. On the other hand, the present system allows the administrator to define the process according to predefined business rules and procedures. Documents, items, and folders now progress through the prescribed routing, allowing uniform treatment of all documents, items and folders, preventing user error. This is especially useful for businesses or other entities that handle a large volume of documents, such as insurance companies.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

ACL (access control list): A set of data that informs a computer's operating system which permissions, or access rights, that each user or group has to a specific system object, such as a directory or file. Each object has a unique security attribute that identifies which users have access to it, and the ACL is a list of each object and user access privileges such as read, write or execute.

Attribute: A property or characteristic, and more particularly, a field in a database.

Item: The basic information entities managed by the Library Server. "Items" as used herein come in two types, simple items and resource items. An item can be, for example, any folder or document.

Metadata: Data about data. Metadata is definitional data that provides documentation of or information about other data managed within an environment or by an application. Metadata may document data about data elements or attributes such as name, size, or data type. It may also log data about data structures including length, fields, and columns. Other data included in Metadata encompass the association, storage location, and ownership of data. Metadata may additionally include descriptive information about the context, quality and condition, and/or characteristics of data.

SQL: Structured Query Language, a standardized query language for requesting information from a database.

Figure 1:
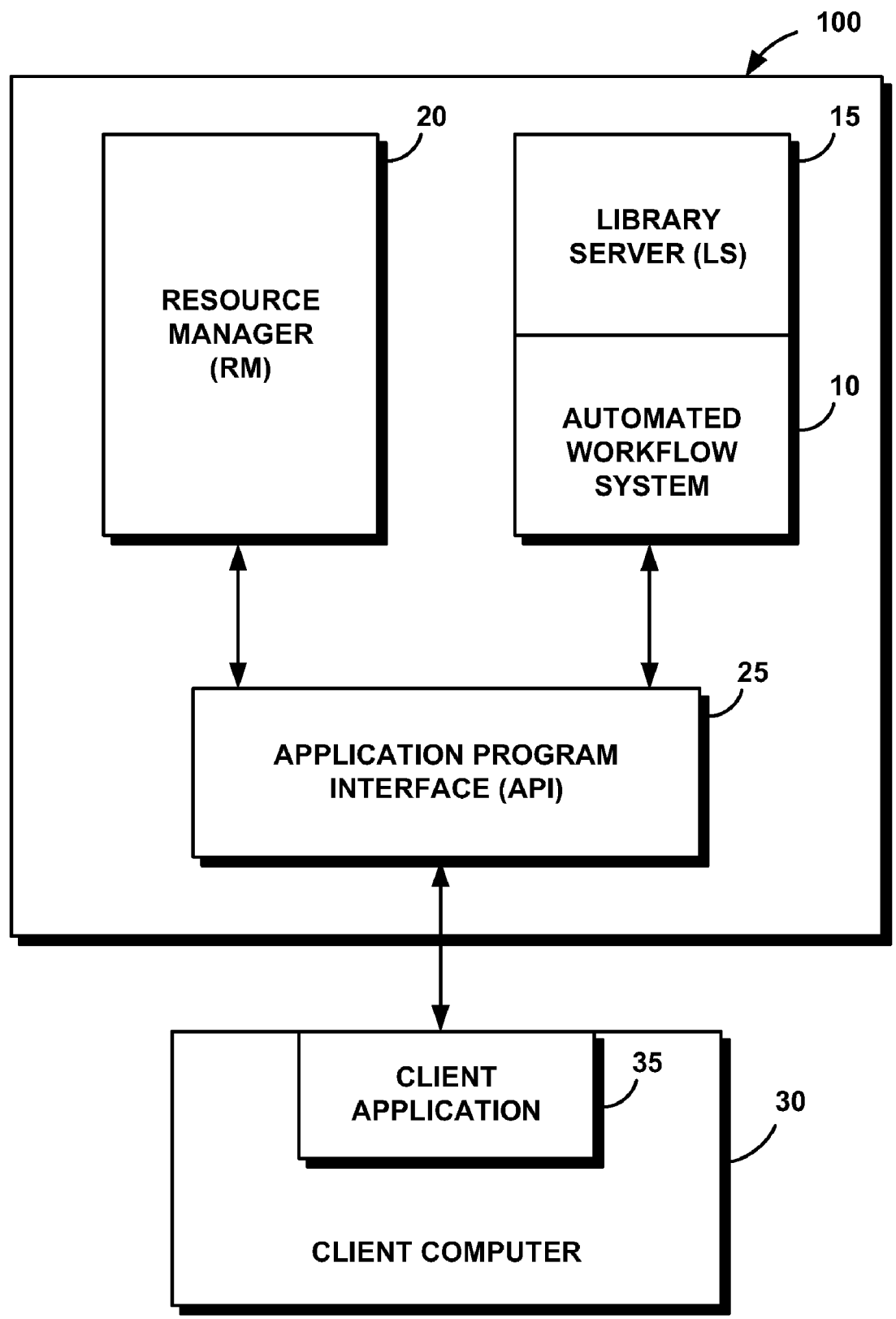
FIG. 1 is a schematic illustration of an exemplary operating environment in which an automated workflow routing system of the present invention can be used.

FIG. 1 illustrates an exemplary content management system 100 comprising an automated workflow system 10 installed in the library server 15. In addition, content management system 100 comprises resource manager 20 and application program interface 25. The automated workflow system 10 includes a software programming code or computer program product that is typically embedded within, or installed on a computer.

A client computer 30 including a client application 35 is coupled to content management system 100 via the application program interface (API) 25.

Library server 15 is coupled to resource manager 20 and contains user and system metadata concerning the primary content (data or objects) that are stored in resource manager 20. Many types of data can be stored in resource manager 20, for example, business information, applications, text, audio, video and streaming data, to name a few.

At a high level, the client application 35 begins a transaction and returns confirmation to the end user. Next, the client application 35 establishes a connection to the library server 15, and sends requests to the library server 15 to create a catalog entry (as an index entry) for a content management object. In response, the client application 35 receives information back from the library server 15 regarding the storage location for the object.

The client application 35 then sends a request to the resource manager 20 to store the object, and receives a response therefrom with the object metadata. This metadata includes, by way of example, the object name, size, and creation timestamp. The client application 35 sends this metadata to the library server 15.

The data model of the content management system 100 is exploited to implement automated workflow system 10. The data model comprises four major elements: process, work node, work package, and work list. The first element, process, comprises a root component row and a child component row. These component rows define the workflow route.

The root component uses a system-defined attribute for Process ID. This Process ID maps to a name and description in the keyword table. The child component includes the following attributes: From Work Node, To Work Node, and Menu entry. The From Work Node is null for the "start" node. The To Work Node is null for the "end" node. The Menu entry is the ID in the keyword table and is used for routing between "From" and "To".

Figure 2:
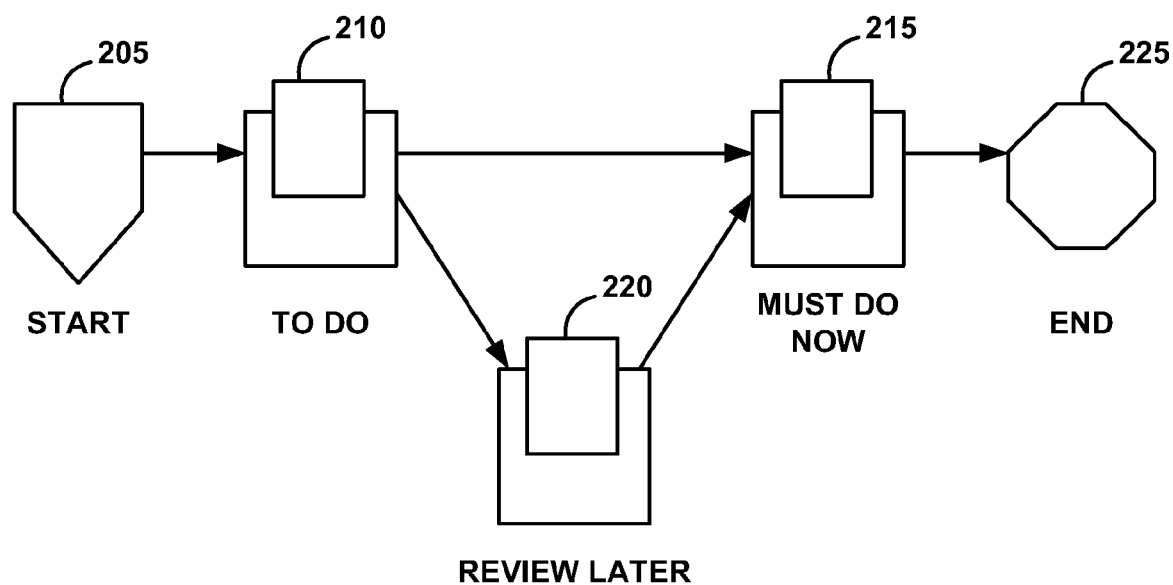
FIG. 2 is a diagram illustrating an exemplary workflow process for routing documents using the system of FIG. 1.

An example of a workflow route is shown in FIG. 2. Workflow commences at "start" 205. All work proceeds to "to do" step 210. At the "to do" step 210, work can either proceed directly to "must do now" step 215, or "review later" step 220. Eventually, work at "review later" step 220 must also be dealt with at "must do now" step 215. Workflow for this process is complete at "end" step 225.

The following Table 1 exemplifies the child component attributes for the workflow. The first row in Table 1 represents the first step in the workflow of FIG. 2. At "start" 205, there is no preceding step in the workflow, so the "From" column in Table 1 is empty. The "To" column represents the workflow destination for the first step. In the case of the example in FIG. 2, work proceeds to "to do" 210, as shown in the first row of Table 1, "To" column. The menu representation for this step is empty, shown in the second row of Table 1, "Menu" column.

TABLE 1

Child component attributes for the workflow of FIG. 2.

| From | To | Menu |
|---|---|---|
|  | To Do |  |
| To Do | Review Later | Do it Later |
| To Do | Must Do Now | Do it Now |
| Must Do Now |  | Done |
| Do It Later | Must Do Now | Ready to Review |

The second and third rows of Table 1 represent the workflow branch at "to do" 210. Work may proceed either to "Review Later" 220 as shown in the third row of Table 1, or to "Must do now" 215 as shown in the fourth row of Table 1. In addition, all work proceeds from "must do now" 215 to "end" 225, as represented by the sixth row in Table 1. As shown by the "menu" column of Table 1, the menu possibilities for the workflow process of FIG. 2 are "Do it Later", "Do it Now", and "Done".

The work node comprises an item with a root component containing attributes and a child component to implement work packages. The attributes of the root component of the item include:

ID (an entry in the keyword table containing Name and Description);
Type (Work Basket, Collection Point);
Notify time (minutes or 0);
Overload Limit; and
Exits to be run on the library server 15 (DLL and function name). Exits to be run on the library server 15 comprise overload exit, "entering work node" exit, and "leaving work node" exit.

The administrator will define the maximum time that work package should be at a given work node. A function is run to identify work packages whose allowed time at a given work node has expired. Any package with allowed time expired is identified with a "notify" flag.

If the work node is a collection point, a child component will be used to list the ItemTypes and number of each ItemType required. An example of a child component at a collection point is shown in Table 2. In this example, a claim folder must have one police report, one estimate, and four photos. A customer inquiry must have either a letter or an e-mail. In both cases, there is no effect on the collection point processing if Items of other types are added to the folder.

TABLE 2

Child components at a collection point.

| Folder Type | Item Type | Number Required |
| --- | --- | --- |
| Claim | Police Report | 1 |
| Claim | Estimate | 1 |
| Claim | Photo | 4 |
| Customer Inquiry | Letter | 0 |
| Customer Inquiry | e-mail | 0 |

A work package comprises a child component of a work node that associates a document or folder being routed with a work node within a process. This child component contains work specific information such as priority. The attributes of this child component include the following:

Priority;
Reference attribute to the item being routed;
ItemID of the process;
UserID of the user that last moved the work package;
Date/time when the package was last moved;
Suspend state (0/1);
Notify state (0/1);
Notify time; and
Resume time.

Reference attributes are used to enable query and ensure referential integrity. The resume list comprises a child component with one row per required ItemType. The child component contains the ItemType and the number of that type required. Setting the required number of the ItemType to "0" indicates that "any" type are accepted, allowing continuation of the work package when any item of a required type arrive. The decision point comprises a child component with one row per "rule" with the "to" work node.

The work list comprises an item that defines the selection criteria for a list of work. This work list item contains the following attributes:

ID (an entry in the keyword table containing name and description);
List of work nodes (ItemIDs);
Selection order (priority, last work date ascending/descending);
Selection filter (suspended 0/1, notify 0/1); and
Number to return (0=all, 1="system assigned", >1 for a limit).

A work list could be defined spanning all workbaskets or a selected subset to show work packages in notify or suspend states. A user authorized to the work list would be able to see the count of waiting work packages. Such a user could then open the work list and make decisions about each work package such as increasing the priority, forcing early resume, forcing exit from a collection point, changing user assignment, etc.

The interfaces of the automated workflow system 10 with library server 15 comprise "Start Process", "End Process", "Route", "GetWorkList", "GetWork", "Suspend", "Resume", and "GetitemRouting". Interfaces with library server 15 are designed to minimize run-time overhead by caching definitions at the client application 35 rather than performing multiple queries on the library server 15. The client application 35 will pass the table names as required to the library server 15.

Figure 3A:
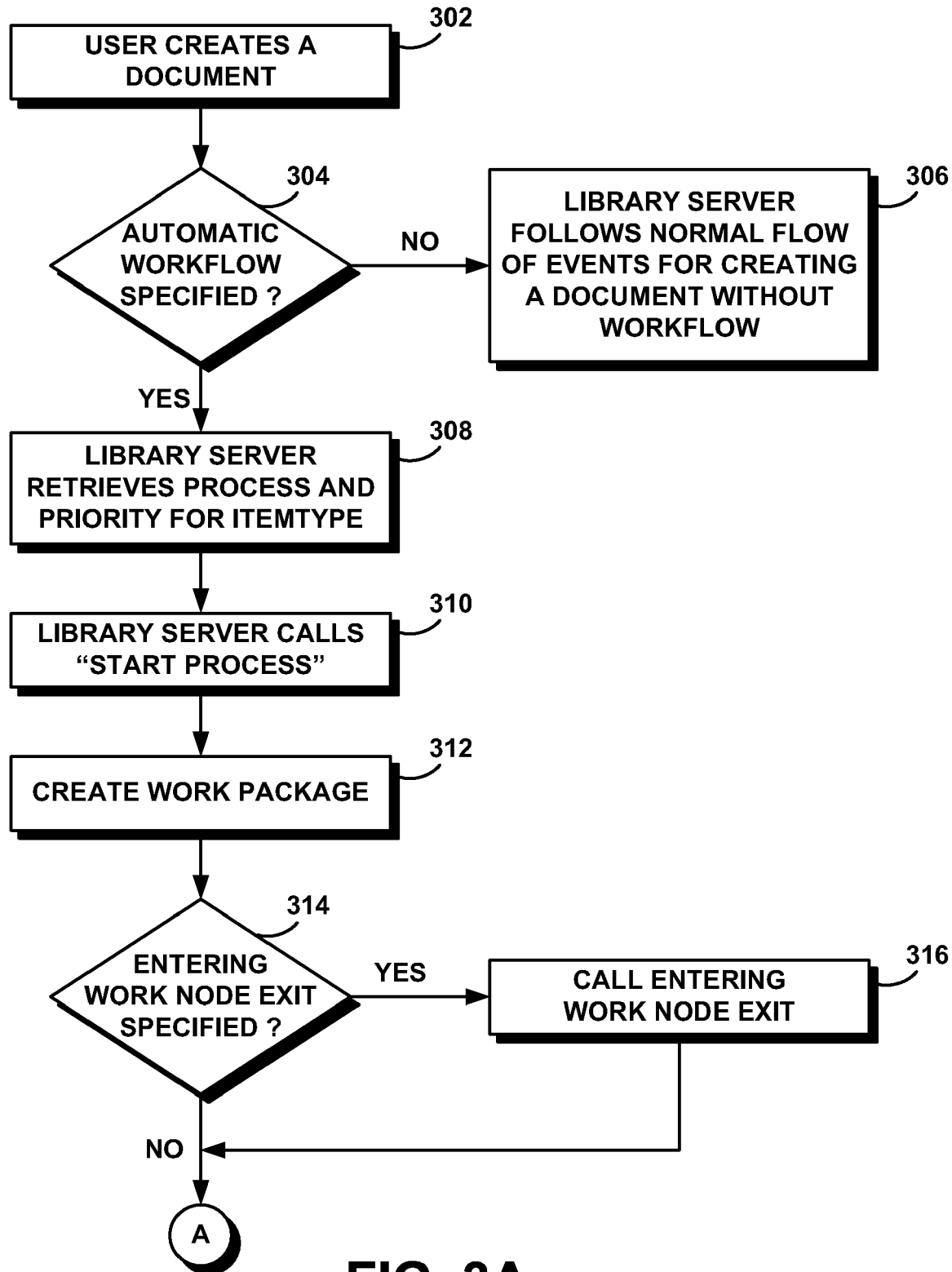
FIG. 3 comprises FIGS. 3A, 3B, and 3C, and represents a process flow chart illustrating a method of operation of the automated workflow system of FIG. 1.
Figure 3B:
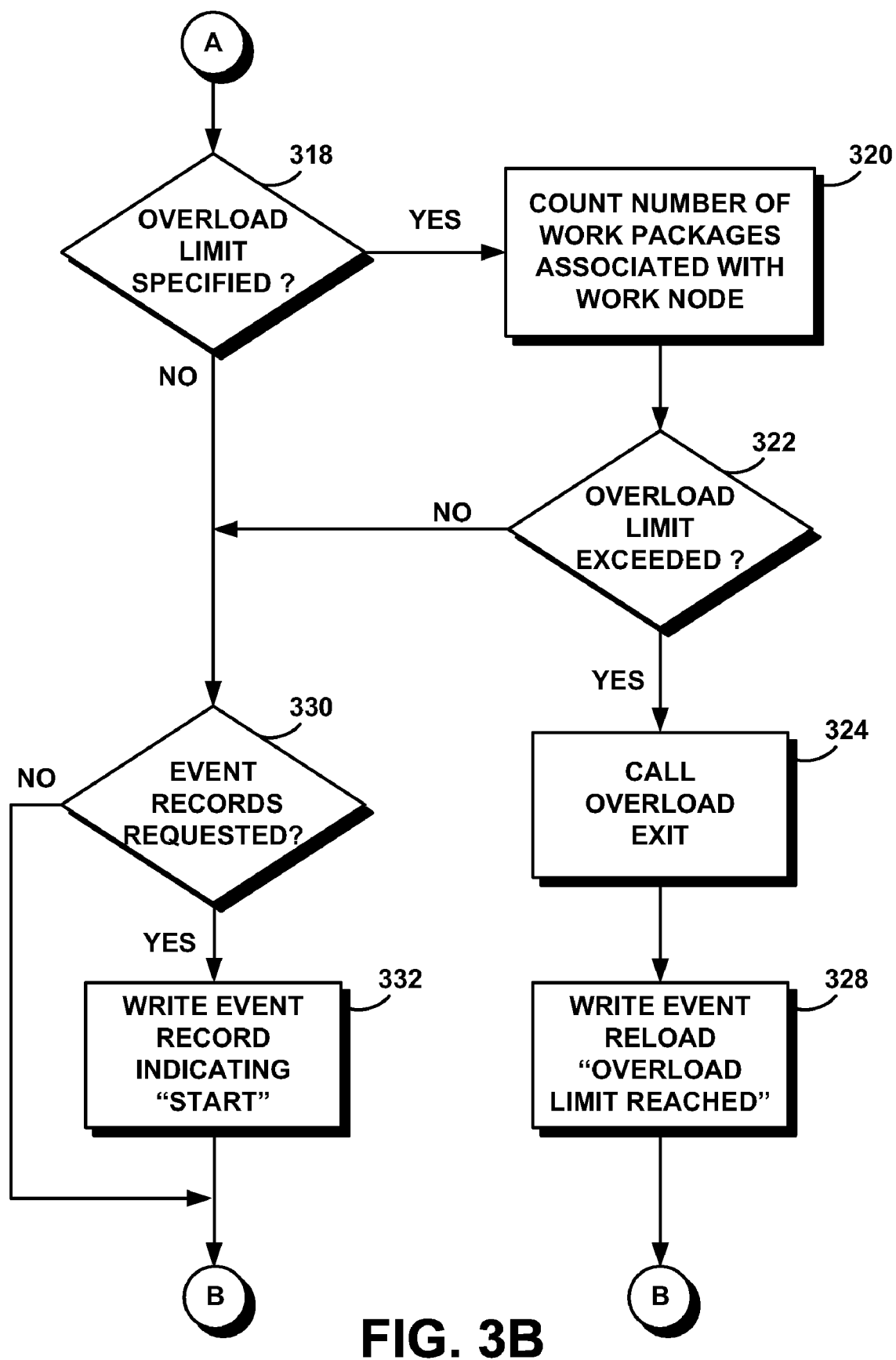
Figure 3C:
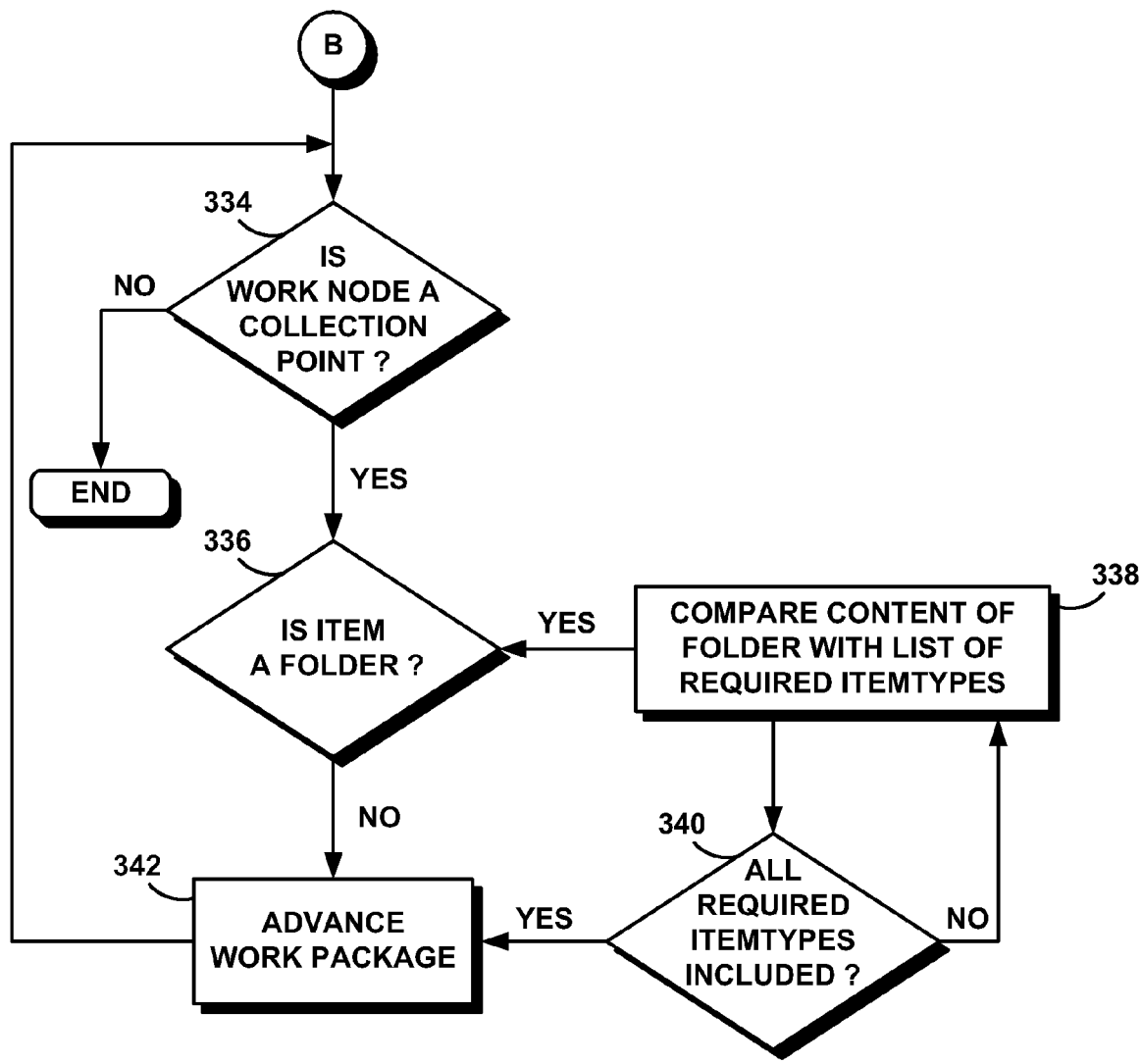

FIGS. 3A, 3B, and 3C illustrate a "Start Process" method 300 of the automated workflow system 10. When a document or folder is created at block 302, system 10 checks to see if automated workflow is specified, as described later.

If the automated workflow is specified at decision block 304, The ItemID for the item created or selected will be started on the specific process at block 310. The input to the process is ItemID of the item being routed, the ItemID of the process, and priority. The outputs of the process are the standard stored procedure parameters and the component ID of the work package, if needed.

At block 312, the automated workflow system 10 creates a work package. The work package is a child component of the work node. The row of the child component contains a reference attribute to the item being routed. Suspend and notify flags are set to 0 and the UserID and timestamp in the work package are set.

At decision block 314, system 10 determines whether an "entering work node" exit is specified. If so, system 10 calls "entering work node" exit. The automated workflow system 10 then proceeds to decision block 318 (FIG. 3B) and checks whether an overload limit has been specified. If so, the automated workflow system 10 counts the number of work packages associated with the present work node at block 320. If the overload limit is exceeded at that node, the automated workflow system 10 calls overload exit at block 324.

The automated workflow system 10 then writes an event record indicated that the overload limit has been reached for that work node at block 328. the automated workflow system 10 proceeds to decision block 330 and checks whether event records have been requested. If so, the automated workflow system 10 writes a record indicating "start" at block 332.

Regardless, the automated workflow system 10 proceeds to decision block 334 (FIG. 3C) and checks whether the work node is a collection point. If so, the automated workflow system 10 proceeds to decision block 336 and checks whether the item being routed is a folder. If so, the automated workflow system 10 compares the content of the folder with the list of required ItemTypes at block 338.

If the required ItemTypes are not included in the folder at decision block 340, the automated workflow system 10 exits. A separate process periodically checks to determine whether all the ItemTypes are present in the folder at decision block 340, the folder is advanced to the next node in the work process at block 342, as would an item that was not a folder at decision block 336. If the work node is not a collection point at decision block 334, work packages are immediately advanced at block 342.

It is to be understood that the specific embodiments of the invention that have been described are merely illustrative of certain application of the principle of the present invention. Numerous modifications may be made to the system and method for automatically starting a document on a workflow process as described herein without departing from the spirit and scope of the present invention.

What is claimed is:

1. A processor-implemented method for automatically starting a plurality of items with different structures on a workflow process, comprising:
    upon creation of each item of the plurality of items, a library server checking a definition of an item type for the item;
    automatically assigning a workflow process to the item type definition according to predefined rules;
    automatically starting the item on the workflow process assigned to the item type, to allow uniform treatment of all the items in the plurality of items, regardless of the structures of the items, without user interference;
    creating a work package on an initial node in the workflow process;
    assigning a priority to the work package; and
    the library server retrieving the workflow process and priority for the item type;
    identifying a work node as a collection point, wherein the work node comprises an item having a root component containing attributes and a child component which implements the work package;
    wherein the attributes of the root component comprise an item ID, type, notify time, overload limit and exits to be run on the library server;
    upon identification of the item at the collection point as a folder,
        comparing the content of the folder with a list of required item types;
        automatically advancing the identified folder with a required item type to a next work node;
        holding the folder without the required item type at the collection point until the required item type is placed in the folder; and
        upon determination that the item is not a folder, advancing the item to the next work node.

2. The method of claim 1, wherein the library server calls a "start process."

3. The method of claim 1, further comprising specifying a work node exit.

4. The method of claim 3, further comprising calling the work node exit.

5. The method of claim 3, further comprising specifying an overload limit for a work node.

6. The method of claim 5, further comprising counting the number of work packages associated with each work node.

7. The method of claim 6, further comprising calling an overload exit if the overload limit is exceeded.

8. The method of claim 7, further comprising removing the work package from the work flow.

9. The method of claim 8, further comprising writing an event record when overload limit reached.

10. The method of claim 3, further comprising requesting an event record.

11. The method of claim 10, further comprising writing an event record indicating "start".

12. The method of claim 3, further comprising calling a "route" function.

13. The method of claim 12, further comprising verifying a user privilege for calling the "route" function.

14. The method of claim 13, further comprising calling a leaving work node exit function.

15. A computer program product having executable instruction codes stored on a computer-usable medium, for automatically starting a plurality of items with different structures on a workflow process, comprising:
    a set of instruction codes for checking a definition of an item type for the item upon creation of each item of the plurality of items;
    a set of instruction codes for automatically assigning a workflow process to the item type definition according to predefined rules;
    a set of instruction codes for automatically starting the item on the workflow process assigned to the item type, to allow uniform treatment of all the items in the plurality of items, regardless of the structures of the items, without user interference;
    a set of instruction codes for creating a work package on an initial node in the workflow process;
    a set of instruction codes for assigning a priority to the work package; and
    a set of instruction codes for retrieving the workflow process and priority for the item type;
    a set of instruction codes for identifying a work node as a collection point, wherein the work node comprises an item having a root component containing attributes and a child component which implements the work package;
    wherein the attributes of the root component comprise an item ID, type, notify time, overload limit and exits to be run on the library server;
    a set of instruction codes for comparing the content of the folder with a list of required item types upon identification of the item at the collection point as a folder;
    a set of instruction codes for automatically advancing the identified folder with a required item type to a next work node,
    a set of instruction codes for holding the folder without the required item type at the collection point until the required item type is placed in the folder; and
    a set of instruction codes for advancing the item to the next work node upon determination that the item is not a folder.

16. The computer program product of claim 15, wherein the set of instruction codes for retrieving the process and priority for the item type calls a "start process."

17. The computer program product of claim 15, further comprising a set of instruction codes for specifying a work node exit.

18. The computer program product of claim 17, wherein the set of instruction codes for specifying a work node exit calls the work node exit.

19. The computer program product of claim 17, wherein the set of instruction codes for specifying a work node exit further specifies an overload limit for a work node.

20. The computer program product of claim 19, wherein the set of instruction codes for specifying a work node exit counts the number of work packages associated with each work node.

21. The computer program product of claim 20, wherein the set of instruction codes for specifying a work node exit further calls an overload exit if the overload limit is exceeded.

22. The computer program product of claim 21, wherein the set of instruction codes for specifying a work node exit further removes the work package from the work flow.

23. The computer program product of claim 22, wherein the set of instruction codes for specifying a work node exit further writes an event record when overload limit reached.

24. A processor-implemented system embodied on a computer for automatically starting a plurality of items with different structures on a workflow process, comprising:
- means for checking a definition of an item type for the item upon creation of each item of the plurality of items;
- means for automatically assigning a workflow process to the item type definition according to predefined rules;
- means for automatically starting the item on the workflow process assigned to the item type, to allow uniform treatment of all the items in the plurality of items, regardless of the structures of the items, without user interference;
- means for creating a work package on an initial node in the workflow process;
- means for assigning a priority to the work package; and
- means for retrieving the workflow process and priority for the item type;
- means for identifying a work node as a collection point, wherein the work node comprises an item having a root component containing attributes and a child component which implements the work package;
- wherein the attributes of the root component comprise an item ID, type, notify time, overload limit and exits to be run on the library server;
- means for comparing the content of the folder with a list of required item types upon identification of the item at the collection point as a folder;
- means for automatically advancing the identified folder with a required item type to a next work node:
- means for holding the folder without the required item type at the collection point until the required item type is placed in the folder; and
- means for advancing the item to the next work node upon determination that the item is not a folder.

25. The system of claim 24, wherein the retrieving means calls a "start process."

26. The system of claim 24, further comprising means for specifying a work node exit.

27. The system of claim 26, wherein the specifying means calls the work node exit.

28. The system of claim 26, wherein the specifying means further specifies an overload limit for a work node.

29. The system of claim 28, wherein the specifying means further counts the number of work packages associated with each work node.

30. The system of claim 29, wherein the specifying means further calls an overload exit if the overload limit is exceeded.

31. The system of claim 30, wherein the specifying means further removes the work package from the work flow.

32. The system of claim 31, wherein specifying means further writes an event record when overload limit reached.

* * * * *